United States Patent [19]

King

[11] Patent Number: 5,332,245
[45] Date of Patent: Jul. 26, 1994

[54] BICYCLE STEERING FORK BEARING SYSTEM

[76] Inventor: Christopher D. King, 503 Consuelo Dr., Santa Barbara, Calif. 93110

[21] Appl. No.: 9,898

[22] Filed: Jan. 26, 1993

[51] Int. Cl.$^5$ .............................................. B62K 21/18
[52] U.S. Cl. .................................... 280/279; 74/551.1; 74/551.2; 384/517; 403/320; 403/370
[58] Field of Search ................ 280/279; 403/320, 368, 403/370; 74/551.1, 551.2; 384/517, 518, 541

[56] References Cited

U.S. PATENT DOCUMENTS

| | | |
|---|---|---|
| 681,325 | 8/1901 | Hullt . |
| 2,310,064 | 2/1943 | Conti . |
| 3,136,149 | 6/1964 | Klein, Jr. . |
| 3,260,535 | 7/1966 | Jaulmes . |
| 3,284,114 | 11/1966 | McCord, Jr. et al. . |
| 3,306,684 | 2/1967 | Klein, Jr. . |
| 3,942,822 | 3/1976 | Lewis . |
| 4,323,263 | 4/1982 | Cook et al. . |
| 4,340,238 | 7/1982 | Cabeza . |
| 4,410,197 | 10/1983 | St Hillaire . |
| 4,526,491 | 7/1985 | Pawsat . |
| 4,624,470 | 11/1986 | Love . |
| 4,653,768 | 3/1987 | Keys et al. . |
| 4,783,187 | 11/1988 | McMurtrey . |
| 4,794,815 | 1/1989 | Borromeo . |
| 5,095,770 | 3/1992 | Rader, III . |

FOREIGN PATENT DOCUMENTS

| | | | |
|---|---|---|---|
| 561703 | 8/1923 | France . | |
| 1101558 | 4/1955 | France . | |
| 2612482 | 9/1988 | France | 280/279 |
| 62168294 | 5/1989 | Japan . | |

Primary Examiner—Mitchell J. Hill
Attorney, Agent, or Firm—Marvin E. Jacobs

[57] ABSTRACT

In bicycles that have the front fork and handle bars attached to a steering tube that rotates within a frame mounted head tube, a bearing system wherein a compression ring slides over and about the steering tube to trap the bearing against the head tube. Lock nuts surround the tapered compression ring so that when they are threaded together they squeeze the ring against the steering tube. Threads or barbs on the inside of the ring dig into the steering tube to resist movement away from the bearing and allow the ring to be moved against the bearing and establish a proper bearing end load. Further tightening of the lock nuts holds the ring permanently in place.

16 Claims, 2 Drawing Sheets

BICYCLE STEERING FORK BEARING SYSTEM

DESCRIPTION

Technical Field

This invention pertains to means for securing and locating bearings between relatively rotatable concentric tubes, particularly between the steerer tube of a bicycle and the frame mounted head tube within which the steerer tube rotates.

Background of the Invention

Typical prior art bicycles mount the front wheel and handle bars on a steerer tube. The steerer tube pivots inside a cylindrical head tube at the front of the bike frame. Usually, ball bearing assemblies are fastened to the top and bottom of the head tube so as to locate the steerer tube and permit low friction steering.

A good example of the prior art is shown in the Rader U.S. Pat. No. 5,095,770 and the references cited therein. In order to avoid complexity and external threads on the steerer tube, Rader teaches the use of a wedge shaped or tapered compression ring that slides along the outside of the steerer tube and into a tapered space between the steering tube and the bearing. An adjusting nut at the top of the steering tube presses down on the compression ring, acting through the handle bar stem, so as to simultaneously snug the bearing against the end of the head tube and clamp the bearing to the steering tube.

The problem with the Rader approach is that the loading pressure of the bearing against the head tube is unpredictable and uncontrollable. The adjusting nut must be tightened enough to secure the bearing to the steering tube. In so doing, the loading of the bearing against the head tube simply increases at the same time, possibly to an unacceptably high or low value.

Another prior art solution is found in the Cabeza U.S. Pat. No. 4,340,238. Cabeza uses threads on the outside of the steerer tube upon which the bearing advances to the desired loading against the end of the head tube. The bearing is then locked in place on the steerer tube with a clamping ring. The disadvantage of this approach is that the steering tube must be provided with external threads which is more expensive and may weaken the tube. The present invention avoids these problems with a bearing securing system that allows both the clamping force to the steering tube and the bearing end loading force to be adjusted independently, while at the same time eliminating the need to manufacture threads on the outside of the steering tube.

STATEMENT OF THE INVENTION

Briefly, the instant invention utilizes a pair of cooperating locking nuts that slip over the steering tube and trap a tapered compression ring against the steering tube. As the nuts are threaded together, they squeeze the compression ring tightly against the steering tube, holding it in place. The compression ring is provided with sharp threads on its inner, steering tube facing, surface. Consequently, as it is squeezed inward, the threads cut slightly into the steering tube. The locking nut and compression ring assembly can now be rotated to simultaneously form and follow threads cut into the steering tube, advancing the compression ring against the head tube bearings to establish the proper end loading on the bearings. Once the correct end loading is set, the locking nuts are further threaded together to lock the compression ring in place. Hence, the end load of the bearings is adjustable independently from the clamping force. Additionally, the steering tube does not need threads, since the securing system automatically forms threads as needed and where needed.

In an alternative embodiment, annular or discrete barbs may be formed on the inside surface of the compression ring, rather than threads. Such barbs resist movement away from the bearing but allow the compression ring to be easily slid into locating contact with the bearing.

Another embodiment of the invention utilizes a clamp to squeeze the compression ring against the steering tube rather than locking nuts. Other alternatives, advantages, and benefits will become apparent upon consideration of the following detailed description and the drawings referenced thereby.

DETAILED DESCRIPTION OF THE INVENTION

Figure 1:
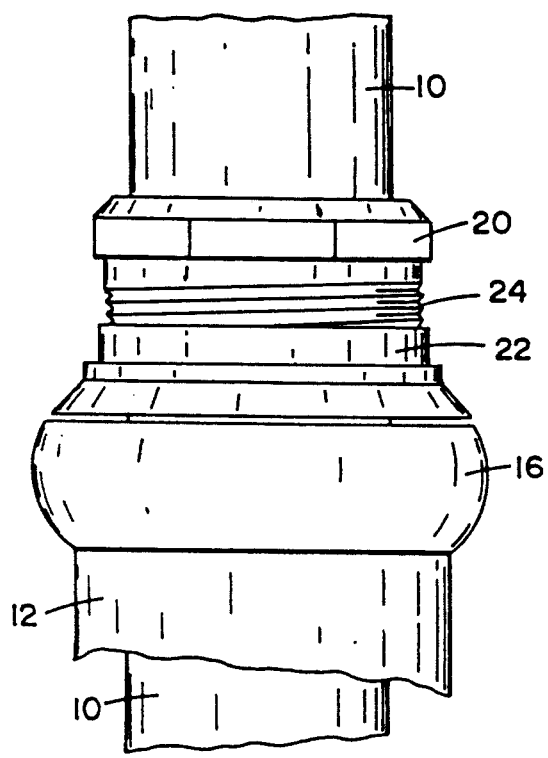
FIG. 1 shows an elevational view of the bearing system of the present invention applied to fragmentary sections of concentric tubes.
Figure 2:
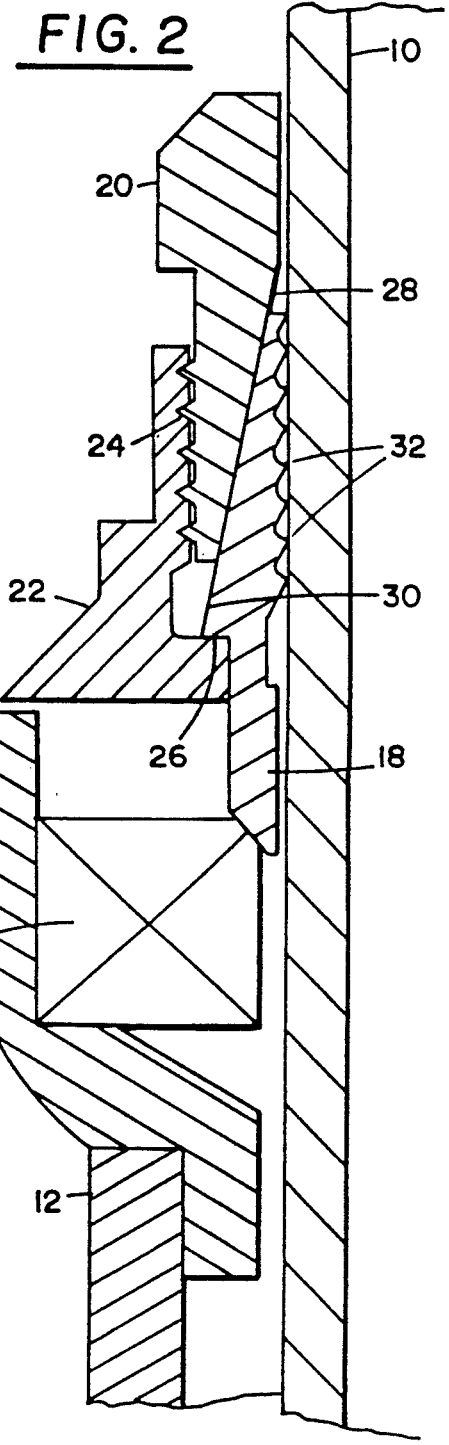
FIG. 2 is an enlarged sectional view of the left side of the FIG. 1 bearing assembly with the cooperating nuts threaded more tightly together than in FIG. 1.

Referring to FIGS. 1 and 2, a fragment of a tube 10, which may be the steering tube of a bicycle, is shown mounted for rotation within a concentric larger fragmentary tube 12, which may be the head tube at the front of a bicycle frame. A conventional ball or roller bearing 14 is supported within a bearing housing 16. Housing 16 sits firmly within the end of tube 12, perhaps by a press fit, so as to support bearing 14 relative to head tube 12. A similar bearing system may be employed at the other end of tube 12, or if desired, another bearing system.

In order to support bearing 14 relative to the inner tube 10, a compression ring 18 is located against bearing 14 and also secured about tube 10. To secure ring 18, a pair of cooperating nuts 20 and 22 are threaded together by means of threads 24. Ring 18 rests on a ledge 26 on nut 22. As nut 20 is threaded into nut 22, a tapered surface 28 thereon engages a corresponding tapered surface 30 on ring 18 so as to squeeze ring 18 against tube 10. Ring 18 includes sharp protruding threads, barbs, or ridges 32 which press into the outside surface of tube 10 when so squeezed. The threads or ridges 32 may be continuous, intermittent, or comprised of relatively small discrete sections. If threads are used, the assembly of nuts 20 and 22 with ring 18 can be rotated so as to advance the threads toward bearing 14 until a desired snug fit with the correct bearing end load is achieved. The threads 32 cut or form matching threads in tube 10 and follow these formed threads. When ring 18 is properly seated against bearing 14, nuts 20 and 22 are further tightened relative to each other so as to solidly lock ring 18 in place.

Compression ring 18 is, therefore, firmly anchored to tube 10 without the need of threads on the outside of tube 10. In addition, it is not necessary to screw a locking nut inside the upper end of tube 10 as in the case of the above referenced Rader patent. Hence, the top of the steering tube is available to mount handlebars or other attachments.

Figure 3:
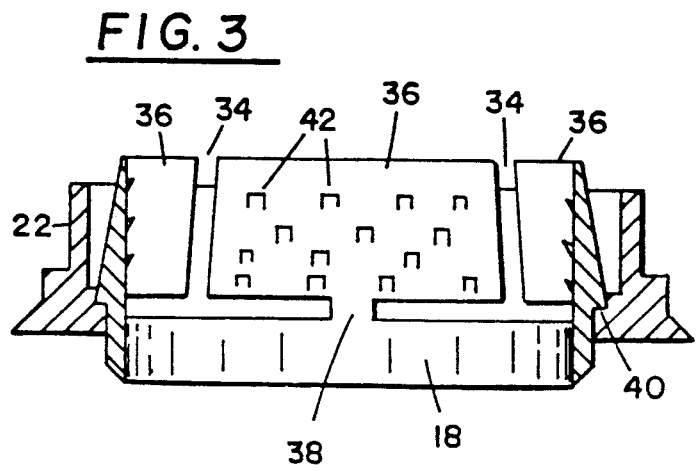
FIG. 3 shows the compression ring in greater detail, and in section, and also shows various alternative embodiments.

FIG. 3 shows ring 18 in section. Ring 18 may be of an elastic material in order to be compressible against tube 10, or provided with relief slots 34 as shown in FIG. 3. Slots 34 divide ring 18 into several segments 36. Further flexibility is achieved by connecting segments 36 to the base of ring 18 with smaller webs 38. To insure that ring 18 rotates with nuts 20 and 22, segments 36 may be notched into nut 22 as shown at 40 in FIG. 3.

Rather than the threads 32 shown in FIG. 2, FIG. 3 shows an alternative embodiment wherein a plurality of sharp discrete barbs 42 are formed on the inside of ring 18 so as to resist movement away from bearing 14. In this arrangement, the assembly of nuts 20 and 22 with ring 18 would be slid or tapped into place against bearing 14 rather than rotated along threads 32. Barbs 42 engage tube 10 and resist movement away from the bearing. Irrespective of whether the movement resisting means comprises continuous rings, threads, or ledges, or intermittent rings, threads, or barbs, they are inclined away from the bearing as shown in the drawings so as to be more easily moved toward the bearing than away. And final locational locking is accomplished by the relative rotation of nuts 20 and 22 so as to fully compress ring 18 into a non-rotating configuration.

Figure 4:
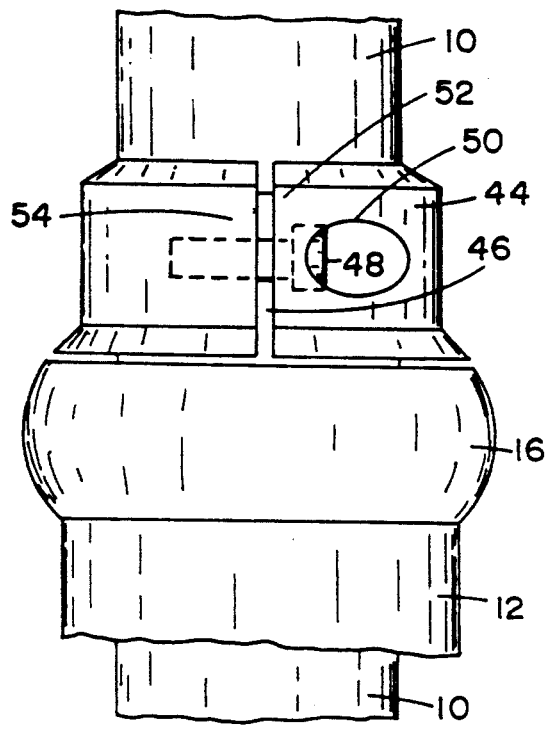
FIGS. 4 and 5 are views similar to FIGS. 1 and 2, respectively, but showing an embodiment in which a clamp encircles and compresses the compression ring instead of cooperating nuts.
Figure 5:
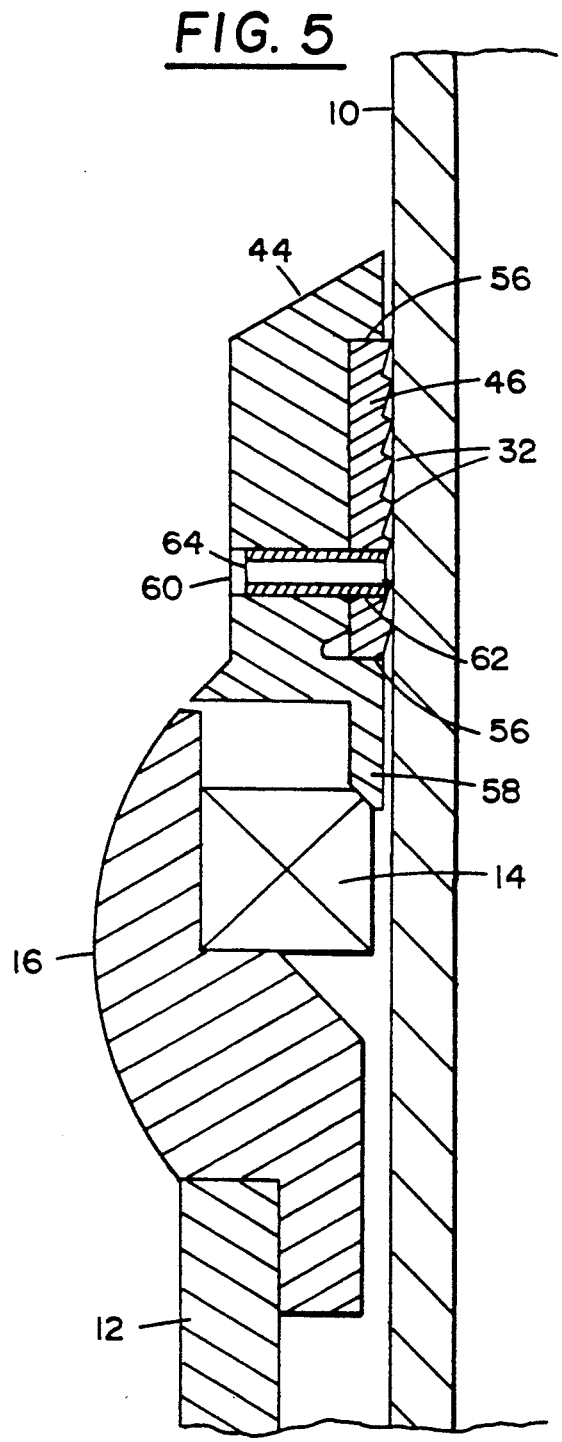

Another alternative embodiment is to replace cooperating nuts 20 and 22 with a different compressing means disposed around the outside circumference of the compression ring. Such an arrangement is shown in FIGS. 4 and 5. A clamp 44 may be positioned around a compression ring 46. The ends of the clamp are pulled toward each other with a screw 48 that passes through a hole 50 in one clamp end 52 and enters a threaded receptacle in the other clamp end 54. The clamp, when so tightened around ring 46, squeezes it against tube 10, operating in much the same way as the familiar radiator hose clamp. Clamp 44 includes a pair of ledges 56, similar to ledge 26, in order to prevent relative movement between ring 46 and clamp 44. A portion 58 of encircling clamp 44 extends down into contact with bearing 14 rather than having the compression ring contact bearing 14. In this embodiment, the movement resisting means 32 still perform the function of locating bearing 14, but the actual contact with bearing 14 is by the encircling compressing clamp, specifically portion 58. Clamp 44 has a hole 60 and compression ring 46 has a similar hole 62. A roll pin 64 is inserted in holes 60 and 62 to prevent relative rotation between clamp 44 and ring 46. Additionally, rotation of the whole assembly is easily accomplished by inserting a wrench inside roll pin 64. This wrench may be the same wrench used to tighten screw 48.

Yet another alternative is to thread the encircling bearing contacting clamp onto the outside of compression ring 46 so as to provide another way to adjust the end load on the bearing, perhaps even when the bicycle is in use. One can simply loosen the clamp tightening screw 48, rotate the clamp 44 relative to ring 46, and thus move the clamp toward or away from bearing 14.

Clearly, limitation only in accordance with the appended claims and their equivalents is appropriate due to the large variety of possible compressing means, bearing designs, bearing housings, locking nut shapes, and movement resisting means that still remain within the spirit and scope of the invention.

I claim:

1. A bearing securing system for relatively rotatable concentric tubes such as used in bicycle steering structure comprising in combination:
   a head tube on the bicycle structure;
   a steering tube disposed for rotation within said head tube;
   a bearing support housing carried by said head tube;
   a bearing means carried by said support housing so as to be positioned around said steering tube and proximate to said steering tube;
   compressible ring means adapted to encircle and slide along said steering tube so as to locate said bearing means and support said steering rube relative to said bearing means, said ring means having an interior surface that contacts said steering tube and an exterior circumferential surface;
   movement resisting means on at least a portion of said interior surface, said movement resisting means operable to resist movement of the ring means away from said bearing means; and
   compressing means disposed about said exterior surface of said compressible ring means, operable to compress the ring means against said steering tube and thereby urge engagement of said movement resisting means with the steering tube, said compressing means further operable to compress the ring means sufficiently to prevent any movement of said ring means relative to said steering tube.

2. The system of claim 1 in which said compressing means comprises mutually cooperating nuts.

3. The system of claim 2 in which said compressible ring means has a first tapered surface on the exterior surface, and said cooperating nuts comprise first and second threadably connectable nuts, said first nut having means to capture said ring means, said second nut having a second tapered surface adapted to wedge against the first tapered surface, so that as the first and second nuts are threaded together they cooperate to squeeze the compressible ring means against the steering tube.

4. The system of claim 3 in which said movement resisting means comprise threads.

5. The system of claim 4 in which said compressible ring means is slotted to enhance flexibility.

6. The system of claim 2 in which said movement resisting means comprises threads.

7. The system of claim 2 in which said movement resisting means comprises discrete barbs.

8. The system of claim 1 in which said movement resisting means comprises threads.

9. The system of claim 1 in which said movement resisting means comprises discrete barbs.

10. The system of claim 1 in which said compressing means comprises a clamp.

11. The system of claim 10 in which said clamp is circumferentially shortened with a screw.

12. The system of claim 11 in which a portion of said clamp engages said bearing means.

13. The system of claim 12 in which said movement resisting means comprises threads.

14. The system of claim 12 in which said movement resisting means comprises barbs.

15. The system of claim 11 in which said said movement resisting means comprises threads.

16. The system of claim 11 in which said movement resisting means comprises barbs.

* * * * *